(12) United States Patent
Kanai

(10) Patent No.: US 9,309,921 B2
(45) Date of Patent: Apr. 12, 2016

(54) INTERNALLY-TOOTHED GEAR UNIT WITH COMPOSITE ROLLER BEARING, AND WAVE GEAR DEVICE

(75) Inventor: Satoru Kanai, Nagano (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 232 days.

(21) Appl. No.: 14/131,894

(22) PCT Filed: Jul. 29, 2011

(86) PCT No.: PCT/JP2011/004336
§ 371 (c)(1),
(2), (4) Date: Jan. 9, 2014

(87) PCT Pub. No.: WO2013/018121
PCT Pub. Date: Feb. 7, 2013

(65) Prior Publication Data
US 2014/0150586 A1 Jun. 5, 2014

(51) Int. Cl.
*F16H 33/00* (2006.01)
*F16C 19/38* (2006.01)
*F16H 49/00* (2006.01)
*F16H 1/10* (2006.01)

(52) U.S. Cl.
CPC ................ *F16C 19/381* (2013.01); *F16H 1/10* (2013.01); *F16H 49/001* (2013.01); *Y10T 74/19647* (2015.01)

(58) Field of Classification Search
CPC ... Y10T 74/19647; F16C 19/381; F16H 1/10; F16H 49/001
USPC .......................................................... 74/640
See application file for complete search history.

(56) References Cited

U.S. PATENT DOCUMENTS

| | | | |
|---|---|---|---|
| 7,637,664 B2 | 12/2009 | Kiyosawa et al. | |
| 8,596,158 B2 * | 12/2013 | Xu | F16C 19/362 74/412 R |
| 8,991,282 B2 * | 3/2015 | Yajima | F16H 49/001 74/640 |
| 9,003,924 B2 * | 4/2015 | Kanai | F16H 49/001 74/412 R |
| 2002/0174742 A1 * | 11/2002 | Kobayashi | F16C 33/60 74/640 |
| 2005/0217420 A1 * | 10/2005 | Kobayashi | F16H 49/001 74/640 |
| 2007/0157760 A1 * | 7/2007 | Kiyosawa | F16C 19/52 74/640 |
| 2008/0285905 A1 * | 11/2008 | Kiyosawa | F16C 19/381 384/618 |
| 2009/0139358 A1 * | 6/2009 | Ishikawa | F16H 55/0833 74/461 |
| 2009/0293659 A1 * | 12/2009 | Kobayashi | F16H 25/2409 74/460 |
| 2009/0320643 A1 * | 12/2009 | Kanai | F16H 49/001 74/640 |
| 2015/0114174 A1 * | 4/2015 | Roopnarine | F16H 49/001 74/640 |

FOREIGN PATENT DOCUMENTS

| | | |
|---|---|---|
| JP | S49-097141 A | 9/1974 |
| JP | S61-177243 U | 11/1986 |
| JP | H04-351313 A | 12/1992 |
| JP | H08-004845 A | 1/1996 |
| JP | H09-280325 A | 10/1997 |
| JP | 2001-336588 A | 12/2001 |
| JP | 2008-039037 A | 2/2008 |
| JP | 2008-230279 A | 10/2008 |
| JP | 2009-156461 A | 7/2009 |
| WO | 2005/103515 A1 | 11/2005 |

OTHER PUBLICATIONS

International Search Report for PCT/JP2011/004336, Sep. 13, 2011.

* cited by examiner

*Primary Examiner* — William Kelleher
*Assistant Examiner* — Zakaria Elahmadi

(57) ABSTRACT

A wave gear device (30) uses, as a bearing which supports a first rigid internally-toothed gear (31) and a flexible externally-toothed gear (33) so as to be capable of rotation relative to each other, a composite roller bearing (38) equipped with a first roller (53) and second roller (54) for thrust bearing use and a third roller (55) for radial bearing use. Compared to a cross roller bearing or an angular bearing, the composite roller bearing (38) can be implemented as a highly rigid bearing in a small installation space. The first rigid internally-toothed gear (31) and the inner ring portion (51) of the composite roller bearing (38) are formed integrally as a single component, so an attachment part for connecting these members is not necessary. A highly rigid, flat wave gear device can be achieved.

7 Claims, 4 Drawing Sheets understand

INTERNALLY-TOOTHED GEAR UNIT WITH COMPOSITE ROLLER BEARING, AND WAVE GEAR DEVICE

TECHNICAL FIELD

The present invention relates to an internally-toothed gear unit having a composite roller bearing that can bear radial and thrust loads, and a wave gear device configured using this internally-toothed gear unit.

BACKGROUND ART

Small and compact wave gear devices are used as reducers in drive mechanisms such as machine tools and robot hands. A wave gear device is configured from three components: a rigid internally-toothed gear, a flexible externally-toothed gear, and a wave generator, the rigid internally-toothed gear and the flexible externally-toothed gear being supported to be capable of rotating relative to each other via a bearing. The main known examples of wave gear devices are those known as cup-type devices in which the flexible externally-toothed gear has a cup shape, those known as silk-hat-type devices in which the gear has the shape of a silk hat, and those known as flat-type devices in which the gear has a cylindrical shape.

Patent Document 1 (JP-A 2001-336588) discloses a cup-type wave gear device, Patent Document 2 (JP-A 09-280325) discloses a silk-hat-type wave gear device, and Patent Document 3 (JP-A 2009-156461, FIG. 6) discloses a flat-type wave gear device. In Patent Documents 1 and 2, a mechanism is disclosed in which a cross roller bearing is used to support a rigid internally-toothed gear and a flexible externally-toothed gear to be capable of rotating relative to each other.

In Patent Document 4, the applicant proposes a composite roller bearing that can bear loads in the radial direction and in the thrust direction.

PRIOR ART DOCUMENTS

Patent Documents

Patent Document 1: JP-A 2001-336588
Patent Document 2: JP-A 09-280325
Patent Document 3: JP-A 2009-156461
Patent Document 4: WO 2005/103515

DISCLOSURE OF THE INVENTION

Problems to be Solved by the Invention

When the axial dimension of the wave gear device is reduced with the intention to make the device flatter, the size of the bearing is reduced as well, and the bearing inevitably loses rigidity. Therefore, there is a limit to making the wave gear device flatter when high rigidity is required.

In view of the foregoing, an object of the present invention is to provide an internally-toothed gear unit with a composite roller bearing suitable for use in order to impart a flatter profile to a gear reducer such as a wave gear device while maintaining high rigidity.

Another object of the present invention is to provide a flat and highly rigid wave gear device configured using an internally-toothed gear unit with a composite roller bearing.

Means to Solve the Problems

To solve the problems described above, the internally-toothed gear unit with a composite roller bearing of the present invention is characterized in comprising:

an internally-toothed gear and a composite roller bearing;

the internally-toothed gear having a first end surface and second end surface facing each other from the direction of the rotational center axis of the gear and extending in a direction perpendicular to the rotational center axis, and a circular external peripheral surface and circular internal peripheral surface positioned between the first end surface and the second end surface, internal teeth being formed in the circular internal peripheral surface;

the composite roller bearing having an inner ring portion formed integrally with the internally-toothed gear, an outer ring, and a plurality of first rolling objects, a plurality of second rolling objects, and a plurality of third rolling objects inserted in a rollable state between the inner ring portion and the outer ring;

the inner ring portion having a first inner ring race surface formed in the first end surface of the internally-toothed gear, a second inner ring race surface formed in the second end surface of the internally-toothed gear, and a third inner ring race surface formed in the circular external peripheral surface of the internally-toothed gear;

the outer ring having a first outer ring race surface facing the first inner ring race surface, a second outer ring race surface facing the second inner ring race surface, and a third outer ring race surface facing the third inner ring race surface;

the first rolling objects for a thrust bearing being inserted between the first inner ring race surface and the first outer ring race surface;

the second rolling objects for a thrust bearing being inserted between the second inner ring race surface and the second outer ring race surface; and the third rolling objects for a radial bearing being inserted between the third inner ring race surface and the third outer ring race surface.

The outer ring can be configured from a first end plate having an end surface in which the first outer ring race surface is formed, a second endplate having an end surface in which the second outer ring race surface is formed, and a cylindrical member sandwiched between the first end plate and the second end plate and having a circular internal peripheral surface in which the third outer ring race surface is formed.

The configuration can also include a first retainer for a thrust bearing in which the first rolling objects are held between the first inner ring race surface and the first outer ring race surface in a rollable state, a second retainer for a thrust bearing in which the second rolling objects are held between the second inner ring race surface and the second outer ring race surface in a rollable state, and a pair of third retainer portions for a radial bearing which extend from the ends of the first retainer and the second retainer to the area between the third inner ring race surface and the third outer ring race surface, the third rolling objects being held between the third inner ring race surface and the third outer ring race surface in a rollable state.

Furthermore, columnar rollers are preferably used as the first, second, and third rolling objects. Alternatively, balls can also be used as the rolling objects.

Next, the wave gear device of the present invention is characterized in comprising:

an annular rigid internally-toothed gear;

a flexible externally-toothed gear disposed coaxially on the inside of the rigid internally-toothed gear;

a wave generator for causing the flexible externally-toothed gear to flex in a non-circular manner to partially mesh the external teeth of the flexible externally-toothed gear with the internal teeth of the rigid internally-toothed gear in the circumferential direction, and creating relative rotation between the gears by moving the meshing positions of the gears in the circumferential direction; and a composite roller bearing for supporting the rigid internally-toothed gear and the flexible externally-toothed gear in a state that allows the two gears to rotate relative to each other;

the rigid internally-toothed gear having a first end surface and second end surface facing each other from the direction of the rotational center axis of the gear and extending in a direction perpendicular to the rotational center axis, and a circular external peripheral surface and circular internal peripheral surface positioned between the first end surface and the second end surface, internal teeth being formed in the circular internal peripheral surface;

the composite roller bearing having an inner ring portion formed integrally with the internally-toothed gear, an outer ring, and a plurality of first rolling objects, a plurality of second rolling objects, and a plurality of third rolling objects inserted in a rollable state between the inner ring portion and the outer ring;

the inner ring portion having a first inner ring race surface formed in the first end surface of the internally-toothed gear, a second inner ring race surface formed in the second end surface of the internally-toothed gear, and a third inner ring race surface formed in the circular external peripheral surface of the internally-toothed gear;

the outer ring having a first outer ring race surface facing the first inner ring race surface, a second outer ring race surface facing the second inner ring race surface, and a third outer ring race surface facing the third inner ring race surface;

the first rolling objects for a thrust bearing being inserted between the first inner ring race surface and the first outer ring race surface;

the second rolling objects for a thrust bearing being inserted between the second inner ring race surface and the second outer ring race surface; and the third rolling objects for a radial bearing being inserted between the third inner ring race surface and the third outer ring race surface.

In the present invention, a composite roller bearing, which comprises first and second rolling objects supporting thrust force and third rolling objects supporting radial force, is used as a bearing for supporting the rigid internally-toothed gear and the flexible externally-toothed gear in a state that allows them to rotate relative to each other. Higher rigidity can be achieved with less installation space with the composite roller bearing than with a conventional cross roller bearing or angular bearing. Because the rigid internally-toothed gear is integrated into a single component with the inner ring portion of the composite roller bearing, there is no need for an attachment part for linking these members together, which is effective towards making the wave gear device smaller and more compact. Consequently, a highly rigid and flat wave gear device can be achieved according to the present invention.

The outer ring can be configured from a first end plate having an end surface in which the first outer ring race surface is formed, a second endplate having an end surface in which the second outer ring race surface is formed, and a cylindrical member sandwiched between the first end plate and the second end plate and having a circular internal peripheral surface in which the third outer ring race surface is formed.

Next, when the present invention is applied to a silk-hat-type wave gear device, the flexible externally-toothed gear is a silk-hat-shaped gear comprising a cylindrical part capable of flexing in the radial direction, a discoid diaphragm widening outward in the radial direction from one end of the cylindrical part, an annular boss continuing from the external peripheral edge of the diaphragm, and the external teeth formed in the external peripheral surface portion at the other end of the cylindrical part. In this case, the boss is fixed to either the first end plate or the second end plate of the composite roller bearing, or the boss is formed integrally as a part of either end plate.

When the present invention is applied to a cup-profile wave gear device, the flexible externally-toothed gear is a cup-shaped gear comprising a cylindrical part capable of flexing in the radial direction, a discoid diaphragm extending inward in the radial direction from one end of the cylindrical part, a discoid or annular boss continuing from the internal peripheral edge of the diaphragm, and the external teeth formed in the external peripheral surface portion at the other end of the cylindrical part. In this case, the boss is fixed to either the first end plate or the second end plate of the composite roller bearing, or the boss is formed integrally as a part of either end plate.

Furthermore, when the present invention is applied to a flat-profile wave gear device:

the wave gear device has a second rigid internally-toothed gear disposed between the rigid internally-toothed gear and either the first end plate or the second end plate of the outer ring;

the flexible externally-toothed gear in which the external teeth are formed along the circular external peripheral surface of the cylindrical part capable of flexing in the radial direction;

the second rigid internally-toothed gear is either fixed to the end plate or formed integrally as part of the end plate;

the flexible externally-toothed gear has fewer teeth than the rigid internally-toothed gear and the same number of teeth as the second rigid internally-toothed gear; and the flexible externally-toothed gear is flexed in a non-circular manner by the wave generator and made to partially mesh with the rigid internally-toothed gear and the second rigid internally-toothed gear.

MODE FOR CARRYING OUT THE INVENTION

An embodiment of an internally-toothed gear unit with a composite roller bearing and a wave gear device to which the present invention is applied is described below with reference to the drawings.

(Internally-Toothed Gear Unit with Composite Roller Bearing)

Figure 1:
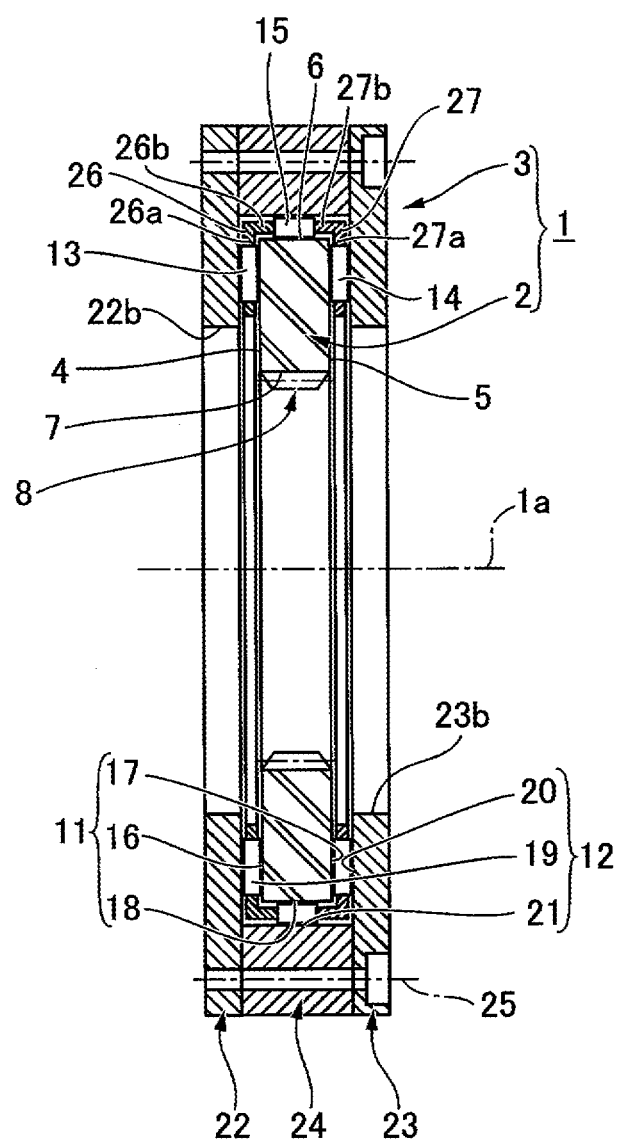
FIG. 1 is a cross-sectional view showing an internally-toothed gear unit with a composite roller bearing to which the present invention is applied.

FIG. 1 is a cross-sectional view showing an internally-toothed gear unit with a composite roller bearing. The internally-toothed gear unit 1 with a composite roller bearing has an internally-toothed gear 2 and a composite roller bearing 3. The internally-toothed gear 2 is composed of an annular member having a rectangular cross section, on either side of which are a first end surface 4 and a second end surface 5 which are flat surfaces extending in a direction perpendicular to the device center axis 1a, with a circular external peripheral surface 6 formed between the external peripheral edges of the first end surface 4 and second end surface 5, and a circular internal peripheral surface 7 formed between the internal peripheral edges thereof. Internal teeth 8 are formed in the circular internal peripheral surface 7 along the circumferential direction.

The composite roller bearing 3 comprises an inner ring portion 11 formed integrally with the internally-toothed gear 2, an outer ring 12, and a plurality of first rollers 13 (first rolling objects) for a thrust bearing, a plurality of second rollers 14 (second rolling objects) for a thrust bearing, and a plurality of third rollers 15 (third rolling objects) for a radial bearing, the rollers all being inserted in a rollable state between the inner ring portion 11 and the outer ring 12. The inner ring portion 11 is composed of a first inner ring race surface 16 formed in the external peripheral edge portion in the first end surface 4 of the internally-toothed gear 2, a second inner ring race surface 17 formed in the external peripheral edge portion in the second end surface 5 of the internally-toothed gear 2, and a third inner ring race surface 18 formed in the circular external peripheral surface 6 of the internally-toothed gear 2. The outer ring 12 comprises a first outer ring race surface 19 facing the first inner ring race surface 16 across a fixed gap from the direction of the device center axis 1a, a second outer ring race surface 20 facing the second inner ring race surface 17 across a fixed gap from the direction of the device center axis 1a, and a third outer ring race surface 21 facing the third inner ring race surface 18 across a fixed gap from the outside of the device's radial direction.

The plurality of first rollers 13 for a thrust bearing are inserted in a rollable state between the first inner ring race surface 16 and the first outer ring race surface 19. The plurality of second rollers 14 for a thrust bearing are inserted in a rollable state between the second inner ring race surface 17 and the second outer ring race surface 20. The plurality of third rollers 15 for a radial bearing are inserted in a rollable state between the third inner ring race surface 18 and the third outer ring race surface 21. Preferably, radial bearings composed entirely of rollers are provided in order to improve load capacity and reduce skewing.

The outer ring 12 is configured from three members: a first end plate 22 having an inside end surface on which the first outer ring race surface 19 is formed, a second endplate 23 having an inside end surface on which the second outer ring race surface 20 is formed, and a cylindrical member 24 coaxially sandwiched between the first endplate 22 and the second endplate 23 and having a circular internal peripheral surface on which the third outer ring race surface 21 is formed. These three members are fixed to each other by a plurality of fastening bolts 25 (shown in the drawing by the single-dot lines). The first end plate 22, the second end plate 23, and the cylindrical member 24 all have the same outside diameter, and the diameters of center through-holes 22b, 23b formed in the first and second end plates 22, 23 are greater than the inside diameter of the internally-toothed gear 2.

Next, a first retainer 26 for a thrust bearing is inserted between the first inner ring race surface 16 and the first outer ring race surface 19. Roller retaining holes 26a are formed in the first retainer 26 at fixed angular intervals along the circumferential direction, and the first rollers 13 are retained in a rollable state in the roller retaining holes. Similarly, a second retainer 27 for a thrust bearing is formed between the other second inner ring race surface 17 and the second outer ring race surface 20, and roller retaining holes 27a are formed in this retainer at fixed angular intervals along the circumferential direction. The second rollers 14 are retained in a rollable state in the roller retaining holes 27a. In the present example, columnar rollers are used as the rolling objects, but rolling objects of other shapes can be used as well.

In the external peripheral edge ends of the first retainer 26 and the second retainer 27 for a thrust bearing are formed third retainer portions 26b, 27b for a radial bearing bent at right angles and extending towards each other. The position of the third rollers 15 in the thrust direction (the direction of the device center axis 1a) is restricted by these retainer portions 26b, 27b.

The internally-toothed gear unit 1 with a composite roller bearing having this configuration can be used as an internally-toothed gear of a gear type reducer, and the composite roller bearing 3 thereof can be used as a bearing for supporting a gear or rotating shaft which rotates relative to the internally-toothed gear. A flat and highly rigid gear type reducer can be achieved by using the internally-toothed gear unit 1 with a composite roller bearing.

(Flat-Type Wave Gear Device)

Figure 2:
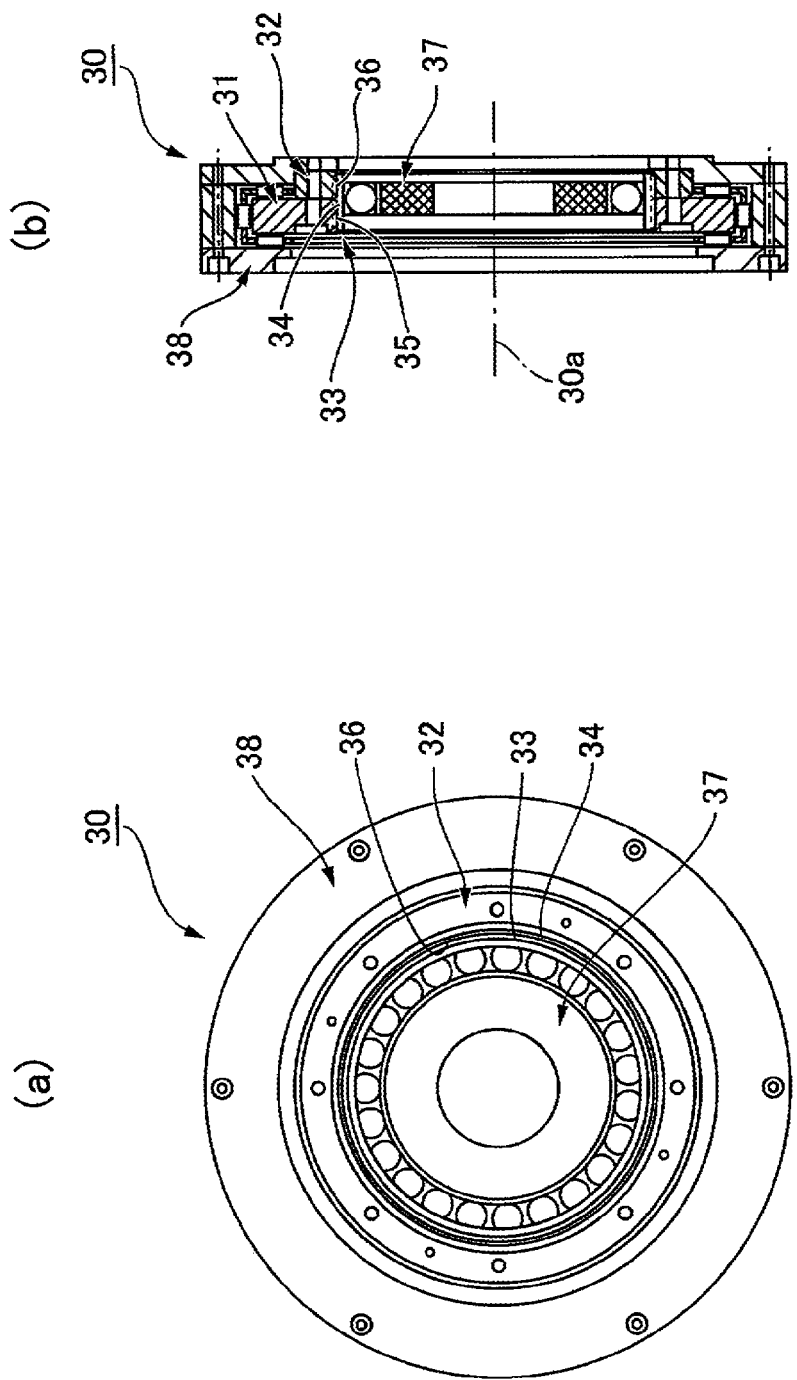
FIG. 2 is a front view and a cross-sectional view showing a flat-profile wave gear device to which the present invention is applied.
Figure 3:
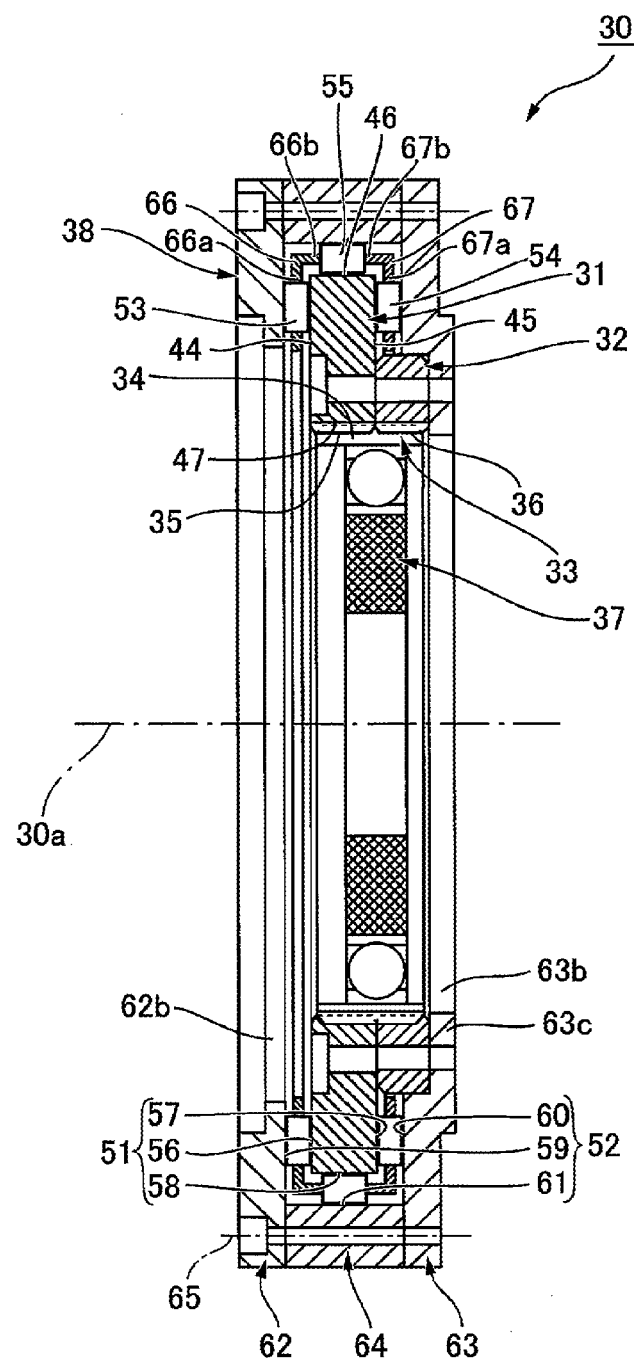
FIG. 3 is an enlarged cross-sectional view showing the wave gear device of FIG. 2.

FIGS. 2(a) and (b) are a front view and a cross-sectional view of a flat-type wave gear device to which the present invention is applied, and FIG. 3 is an enlarged cross-sectional view thereof. The wave gear device 30 has annular first and second rigid internally-toothed gears 31, 32, a flexible externally-toothed gear 33 disposed coaxially inside the first and second rigid internally-toothed gears 31, 32, and a wave generator 37 which causes the flexible externally-toothed gear 33 to flex in a non-circular manner to partially mesh the external teeth 34 of the flexible externally-toothed gear with the internal teeth 35, 36 of the first and second rigid internally-toothed gears 31, 32 in the circumferential direction, and which moves the meshing positions thereof in the circumferential direction. The wave gear device 30 also has a composite roller bearing 38 for supporting the first rigid internally-toothed gear 31 and the flexible externally-toothed gear 33 in a state that allows them to rotate relative to each other.

The flexible externally-toothed gear 33 is a cylindrical flat-profile gear in which the external teeth 34 are formed in the circular external peripheral surface of the cylindrical part which is capable of flexing in the radial direction. The flexible externally-toothed gear 33 has fewer teeth than the first rigid internally-toothed gear 31, and the same number of teeth as the second rigid internally-toothed gear 32. In the present example, the wave generator 37 is elliptically contoured, and the wave generator 37 causes the flexible externally-toothed gear 33 to flex into an ellipsoidal shape and the external teeth 34 thereof to mesh with the internal teeth 35 of the first rigid internally-toothed gear 31 and the internal teeth 36 of the second rigid internally-toothed gear 32 in two locations at the ends of the major axis of the ellipsoidal curve. In this case, the number of teeth of the second rigid internally-toothed gear 32 and the number of teeth of the flexible externally-toothed gear 33 are both 2n (n being a positive integer) fewer than the number of teeth of the first rigid internally-toothed gear 31, and are usually two fewer.

The wave generator 37 is fixed in a linked manner to a rotating member such as a motor output shaft (not shown). When the wave generator 37 rotates, the positions where the flexible externally-toothed gear 33 meshes with the first rigid internally-toothed gear 31 and the second rigid internally-toothed gear 32 move in the circumferential direction. The second rigid internally-toothed gear 32 and the flexible externally-toothed gear 33, having the same number of teeth, do not rotate relative to each other, but rather rotate integrally. The first rigid internally-toothed gear 31 and the flexible externally-toothed gear 33, however, rotate relative to each other according to the difference in their numbers of teeth. For example, when the first rigid internally-toothed gear 31 is fixed in place so as to not rotate, rotation that is greatly reduced compared to the rotation of the wave generator 37 is outputted from the flexible externally-toothed gear 33 via the second rigid internally-toothed gear 32. The load-side member fixed in a linked manner to the second rigid internally-toothed gear 32 is thereby rotatably driven.

Next, the structures of the components will be described. First, the first rigid internally-toothed gear 31 is composed of a rigid annular member having a rectangular cross-sectional shape. On either side of this gear are a first end surface 44 and a second end surface 45, which are flat surfaces extending in a direction perpendicular to a device center axis 30a, and a circular external peripheral surface 46 is formed between the external peripheral edges of the first end surface 44 and the second end surface 45, while a circular internal peripheral surface 47 is formed between the internal peripheral edges thereof. Internal teeth 35 are formed in the circular internal peripheral surface 47 along the circumferential direction.

The composite roller bearing 38 comprises an inner ring portion 51 formed integrally with the first rigid internally-toothed gear 31, an outer ring 52, and a plurality of first rollers 53 (first rolling objects) for a thrust bearing, a plurality of second rollers 54 (second rolling objects) for a thrust bearing, and a plurality of third rollers 55 (third rolling objects) for a radial bearing, the rollers all being inserted in a rollable state between the inner ring portion 51 and the outer ring 52. The inner ring portion 51 is composed of a first inner ring race surface 56 formed in the external peripheral edge portion in the first end surface 44 of the first rigid internally-toothed gear 31, a second inner ring race surface 57 formed in the external peripheral edge portion in the second end surface 45 of the first rigid internally-toothed gear 31, and a third inner ring race surface 58 formed in the circular external peripheral surface 46 of the first rigid internally-toothed gear 31. The outer ring 52 comprises a first outer ring race surface 59 facing the first inner ring race surface 56 across a fixed gap from the direction of the device center axis 30a, a second outer ring race surface 60 facing the second inner ring race surface 57 across a fixed gap from the direction of the device center axis 30a, and a third outer ring race surface 61 facing the third inner ring race surface 58 across a fixed gap from the outside of the device's radial direction.

The plurality of first rollers 53 for a thrust bearing are inserted in a rollable state between the first inner ring race surface 56 and the first outer ring race surface 59. The plurality of second rollers 54 for a thrust bearing are inserted in a rollable state between the second inner ring race surface 57 and the second outer ring race surface 60. The plurality of third rollers 55 for a radial bearing are inserted in a rollable state between the third inner ring race surface 58 and the third outer ring race surface 61. Radial bearings composed entirely of rollers are provided in order to improve load capacity and reduce skewing.

The outer ring 52 is configured from three members: a first end plate 62 having an inside end surface on which the first outer ring race surface 59 is formed, a second endplate 63 having an inside end surface on which the second outer ring race surface 60 is formed, and a cylindrical member 64 coaxially sandwiched between the first endplate 62 and the second endplate 63 and having a circular internal peripheral surface on which the third outer ring race surface 61 is formed. These three members are fixed to each other by a plurality of fastening bolts 65 (shown in the drawing by the single-dot lines). The first end plate 62, the second end plate 63, and the cylindrical member 64 all have the same outside diameter, the diameter of a center through-hole 62b formed in the first endplate 62 is greater than the inside diameter of the first rigid internally-toothed gear 31, and the diameter of a center through-hole 63b formed in the second end plate 63 is substantially equal to the inside diameter of the first rigid internally-toothed gear 31.

Next, a first retainer 66 for a thrust bearing is inserted between the first inner ring race surface 56 and the first outer ring race surface 59. Roller retaining holes 66a are formed in the first retainer 66 at fixed angular intervals along the circumferential direction, and the first rollers 53 are retained in a rollable state in the roller retaining holes. Similarly, a second retainer 67 for a thrust bearing is formed between the other second inner ring race surface 57 and the second outer ring race surface 60, and roller retaining holes 67a are formed in this retainer at fixed angular intervals along the circumferential direction. The second rollers 54 are retained in a rollable state in the roller retaining holes 67a. In the present example, columnar rollers are used as the rolling objects, but rolling objects of other shapes can be used as well.

In the external peripheral edge ends of the first retainer 66 and the second retainer 67 for a thrust bearing are formed third retainer portions 66b, 67b for a radial bearing bent at right angles and extending towards each other. The position of the third rollers 55 in the thrust direction (the direction of the device center axis 30a) is restricted by these retainer portions 66b, 67b.

The second rigid internally-toothed gear 32 is positioned between the first rigid internally-toothed gear 31 and the second endplate 63 of the outer ring 52, and is fixed in a fastened manner to the second end plate 63 by fastening bolts (not shown). Specifically, the internal peripheral edge-facing portion of the second endplate 63 constitutes an uneven part 63c having a slight outward level difference, and the second rigid internally-toothed gear 32 is fixed in a fastened manner to the inside end surface portion of this uneven part 63c. Alternatively, the second rigid internally-toothed gear 32 may be formed integrally with the internal peripheral edge-facing portion of the second end plate 63. In other words, the second end plate 63 and the second rigid internally-toothed gear 32 may be formed from a single component.

In the flat-profile wave gear device 30 configured in this manner, a composite roller bearing 38, which is a three-roller bearing comprising pairs of first and second rollers 53, 54 for a thrust bearing and third rollers 55 for a radial bearing, is used as a bearing for supporting the first rigid internally-toothed gear 31 and the flexible externally-toothed gear 33 in a state that allows them to rotate relative to each other. Higher rigidity can be achieved with less installation space with the composite roller bearing 38 than with a conventional cross roller bearing or angular bearing. Because the inner ring portion 51 of the composite roller bearing 38 is integrated into a single component with the first rigid internally-toothed gear 31, there is no need for an attachment part for linking these members together, which is effective towards making the wave gear device smaller and more compact. Consequently, a flat-profile wave gear device 30 can be obtained which is highly rigid and flatter.

(Silk-Hat-Type Wave Gear Device)

Figure 4:
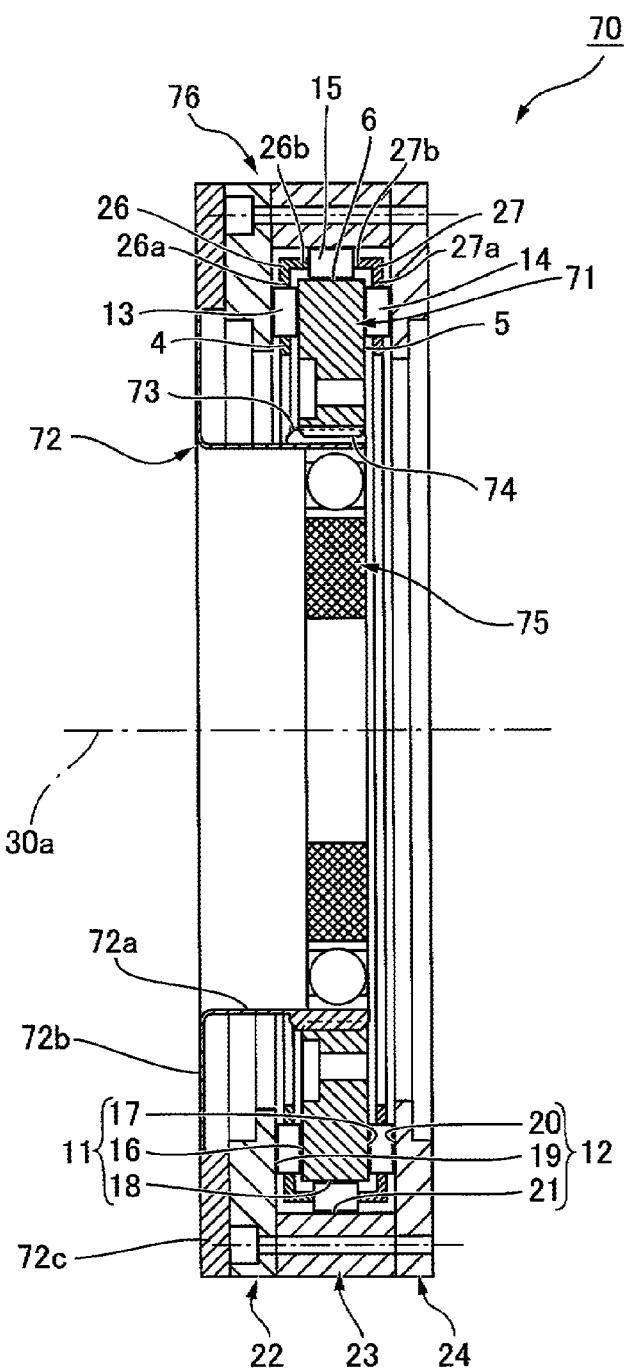
FIG. 4 is a cross-sectional view showing a silk-hat-type wave gear device to which the present invention is applied.

FIG. 4 is a cross-sectional view showing a silk-hat-type wave gear device to which the present invention is applied. The wave gear device 70 has an annular rigid internally-toothed gear 71, a flexible externally-toothed gear 72 disposed coaxially on the inside of the rigid internally-toothed gear, a wave generator 75 which causes the flexible externally-toothed gear 72 to flex in a non-circular manner to partially mesh the external teeth 73 of the flexible externally-toothed gear 72 with the internal teeth 74 of the rigid internally-toothed gear 71 in the circumferential direction, and which moves the meshing positions of these gears 71, 72 in the circumferential direction, and a composite roller bearing 76 which supports the rigid internally-toothed gear 71 and the flexible externally-toothed gear 72 in a state that allows them to rotate relative to each other.

The rigid internally-toothed gear 71 and the composite roller bearing 76 are not described in detail herein because they have the same structures as the internally-toothed gear unit 1 with a composite roller bearing and the internally-toothed gear 2 shown in FIG. 1. In FIG. 4, the same symbols are appended to locations that correspond to the components of FIG. 1.

The flexible externally-toothed gear 72 is a silk-hat-shaped gear comprising a cylindrical part 72a capable of flexing in the radial direction, a discoid diaphragm 72b widening outward in the radial direction from one end of the cylindrical part 72a, an annular boss 72c continuing from the external peripheral edge of the diaphragm 72b, and the external teeth 73 formed in the external peripheral surface portion at the other end of the cylindrical part 72a. The boss 72c is fixed to the first end plate 22 of the composite roller bearing 76. Alternatively, the boss may be formed integrally as part of the first end plate 22. As shall be apparent, it is also possible to fix the boss 72c to, or integrally form the boss 72c with, the side of the second end plate 23.

The present example depicts a silk-hat-type wave gear device; however, the present invention can be similarly applied to a cup-profile wave gear device as well. A flexible externally-toothed gear of a cup-profile wave gear device would be a cup-shaped device comprising a cylindrical part capable of flexing in the radial direction, a discoid diaphragm extending inward in the radial direction from one end of the cylindrical part, a discoid or annular boss continuing from the internal peripheral edge of the diaphragm, and external teeth formed in the external peripheral surface portion at the other end of the cylindrical part. In this case as well, the boss can be fixed to either the first end plate or the second end plate of the composite roller bearing, or the boss can be integrally formed as a part of either end plate.

Other Embodiments

The examples described above are of cases in which the internally-toothed gear unit with a composite roller bearing of the present invention is applied to a wave gear device, but the present invention can also be similarly applied to an internally-toothed gear of a gear-type reducer other than a wave gear device. For example, an internally-toothed gear unit with a composite roller bearing of the present invention can be used as an internally-toothed gear in a planetary gear reducer, and a sun gear, a planetary carrier, or the like can be supported by the composite roller bearing so as to be capable of rotating relative to an internally-toothed gear. A highly rigid and flat planetary gear mechanism can thereby be achieved.

The invention claimed is:

1. An internally-toothed gear unit with composite roller bearing comprising:
    annular first and second rigid internally-toothed gears and a composite roller bearing; wherein
    at least one of the first and second rigid internally-toothed gear has a first end surface and second end surface facing each other from a direction of a rotational center axis of the gear and extending in a direction perpendicular to the rotational center axis, and a circular external peripheral surface and circular internal peripheral surface positioned between the first end surface and the second end surface, internal teeth being formed in the circular internal peripheral surface;
    the composite roller bearing has an inner ring portion formed integrally with at least one of the first and second internally-toothed gears, an outer ring, a plurality of first rolling objects, a plurality of second rolling objects, and a plurality of third rolling objects, with the first, second and third rolling objects being inserted in a rollable state between the inner ring portion and the outer ring;
    the inner ring portion has a first inner ring race surface formed in the first end surface of at least one of the first and second internally-toothed gears, a second inner ring race surface formed in the second end surface of at least one of the first and second internally-toothed gears, and a third inner ring race surface formed in the circular external peripheral surface of at least one of the first and second internally-toothed gears;
    the outer ring has a first outer ring race surface facing the first inner ring race surface, a second outer ring race surface facing the second inner ring race surface, and a third outer ring race surface facing the third inner ring race surface;
    the first rolling objects for a thrust bearing are inserted between the first inner ring race surface and the first outer ring race surface;
    the second rolling objects for a thrust bearing are inserted between the second inner ring race surface and the second outer ring race surface; and
    the third rolling objects for a radial bearing are inserted between the third inner ring race surface and the third outer ring race surface;
    the outer ring comprises a first end plate having an end surface in which the first outer ring race surface is formed, a second end plate having an end surface in which the second outer ring race surface is formed, and a cylindrical member sandwiched between the first end plate and the second end plate and having a circular internal peripheral surface in which the third outer ring race surface is formed;
    a first retainer for a thrust bearing in which the first rolling objects are held between the first inner ring race surface and the first outer ring race surface in a rollable state;
    a second retainer for a thrust bearing in which the second rolling objects are held between the second inner ring race surface and the second outer ring race surface in a rollable state;
    a pair of third retainer portions for a radial bearing which extend from ends of the first retainer and the second retainer to an area between the third inner ring race surface and the third outer ring race surface, the third rolling objects being held between the third inner ring race surface and the third outer ring race surface in a rollable state;
    the second end plate is formed on a radially inner side portion thereof with an uneven part, the uneven part being located on an inner side of the second outer ring race surface;
    the second rigid internally-toothed gear is positioned between the first rigid internally-toothed gear and the uneven part of the second end plate, and is positioned on a radially inner side of the second outer ring race surface and the second retainer; and
    the second rigid internally-toothed gear is fixed to an inside end surface portion of the uneven part, or is formed integrally with the uneven part.

2. The internally-toothed gear unit with composite roller bearing according to claim 1, wherein columnar rollers are used as the first, second, and third rolling objects.

3. A wave gear device comprising:
annular first and second rigid internally-toothed gears;
a flexible externally-toothed gear disposed coaxially on an inside of the first and second rigid internally-toothed gears;
a wave generator which causes the flexible externally-toothed gear to flex in a non-circular manner to partially mesh external teeth of the flexible externally-toothed gear with internal teeth of the first and second rigid internally-toothed gears in the circumferential direction, and which moves meshing positions of the first and second rigid internally-toothed gears in the circumferential direction; and
a composite roller bearing for supporting the first rigid internally-toothed gear and the flexible externally-toothed gear in a state that allows them to rotate relative to each other; wherein
the flexible externally toothed gear is a flat-profile gear having a cylindrical part capable of flexing in a radial direction in which the external teeth are formed in a circular external peripheral surface of the cylindrical part;
the flexible externally-toothed gear has fewer teeth than the first rigid internally-toothed gear, and the same number of teeth as the second rigid internally-toothed gear;
at least one of the first and second rigid internally-toothed gears has a first end surface and second end surface facing each other from a direction of a rotational center axis of the gear and extending in a direction perpendicular to the rotational center axis, and a circular external peripheral surface and circular internal peripheral surface positioned between the first end surface and the second end surface, internal teeth being formed in the circular internal peripheral surface;
the composite roller bearing has an inner ring portion formed integrally with at least one of the first and second internally-toothed gears, an outer ring, a plurality of first rolling objects, a plurality of second rolling objects, and a plurality of third rolling objects, with the first, second and third rolling objects being inserted in a rollable state between the inner ring portion and the outer ring;
the inner ring portion has a first inner ring race surface formed in the first end surface of at least one of the first and second internally-toothed gears, a second inner ring race surface formed in the second end surface of at least one of the first and second internally-toothed gears, and a third inner ring race surface formed in the circular external peripheral surface of at least one of the first and second internally-toothed gears;
the outer ring has a first outer ring race surface facing the first inner ring race surface, a second outer ring race surface facing the second inner ring race surface, and a third outer ring race surface facing the third inner ring race surface;
the first rolling objects for a thrust bearing are inserted between the first inner ring race surface and the first outer ring race surface;
the second rolling objects for a thrust bearing are inserted between the second inner ring race surface and the second outer ring race surface; and
the third rolling objects for a radial bearing are inserted between the third inner ring race surface and the third outer ring race surface;
the outer ring comprises a first end plate having an end surface in which the first outer ring race surface is formed a second end late having an end surface in which the second outer ring race surface is formed, and a cylindrical member sandwiched between the first end plate and the second end plate and having a circular internal peripheral surface in which the third outer ring race surface is formed;
a first retainer for a thrust bearing in which the first rolling objects are held between the first inner ring race surface and the first outer ring race surface in a rollable state;
a second retainer for a thrust bearing in which the second rolling objects are held between the second inner ring race surface and the second outer ring race surface in a rollable state;
a pair of third retainer portions for a radial bearing which extend from ends of the first retainer and the second retainer to an area between the third inner ring race surface and the third outer ring race surface, the third rolling objects being held between the third inner ring race surface and the third outer ring race surface in a rollable state;
the second end plate is formed on a radially inner side portion thereof with an uneven part, the uneven part being located on an inner side of the second outer ring race surface;
the second rigid internally-toothed gear is positioned between the first rigid internally-toothed gear and the uneven part of the second end plate, and is positioned on a radially inner side of the second outer ring race surface and the second retainer; and
the second rigid internally-toothed gear is fixed to an inside end surface portion of the uneven part, or is formed integrally with the uneven part.

4. The wave gear device according to claim 3, wherein columnar rollers are used as the first, second, and third rolling objects.

5. The wave gear device according to any one of claims 3 and 4, wherein
the flexible externally-toothed gear is a silk-hat-shaped gear comprising a cylindrical part capable of flexing in a radial direction, a discoid diaphragm widening outward in the radial direction from one end of the cylindrical part, an annular boss continuing from an external peripheral edge of the diaphragm, and the external teeth formed in an external peripheral surface portion at the other end of the cylindrical part; and
the boss is fixed to either the first end plate or the second end plate of the composite roller bearing, or the boss is formed integrally as a part of either end plate.

6. The wave gear device according to any one of claims 3 and 4, wherein
the flexible externally-toothed gear is a cup-shaped gear comprising a cylindrical part capable of flexing in a radial direction, a discoid diaphragm extending inward in the radial direction from one end of the cylindrical part, a discoid or annular boss continuing from an internal peripheral edge of the diaphragm, and the external teeth formed in an external peripheral surface portion at the other end of the cylindrical part; and
the boss is fixed to either the first end plate or the second end plate of the composite roller bearing, or the boss is formed integrally as a part of either end plate.

7. The wave gear device according to claim 3, wherein the first, second, and third rolling objects are columnar rollers; and the third rolling objects for a radial bearing constitute a full type roller bearing.

* * * * *